US007694409B2

(12) United States Patent
Mo et al.

(10) Patent No.: US 7,694,409 B2
(45) Date of Patent: Apr. 13, 2010

(54) METHOD FOR INSULATING ELECTRICAL MACHINE

(75) Inventors: Rihong Mo, Erie, PA (US); Shuo Chen, Erie, PA (US)

(73) Assignee: General Electric Company, Schenectady, NY (US)

( * ) Notice: Subject to any disclaimer, the term of this patent is extended or adjusted under 35 U.S.C. 154(b) by 239 days.

(21) Appl. No.: 11/869,444

(22) Filed: Oct. 9, 2007

(65) Prior Publication Data

US 2009/0089996 A1 Apr. 9, 2009

(51) Int. Cl.
*H02K 15/10* (2006.01)

(52) U.S. Cl. .............................. 29/596; 29/597; 29/598; 310/215; 427/116

(58) Field of Classification Search ........... 29/596–598, 29/605; 310/215–218; 427/116, 294, 342, 427/512, 517, 521
See application file for complete search history.

(56) References Cited

U.S. PATENT DOCUMENTS

| 4,616,407 | A | * | 10/1986 | Tamaki et al. | ................. 29/596 |
| 5,276,073 | A | * | 1/1994 | Akutagawa et al. | ......... 523/440 |
| 5,466,492 | A | | 11/1995 | Kießling et al. | |
| 5,685,910 | A | | 11/1997 | Thigpen | |
| 7,146,706 | B2 | * | 12/2006 | Du et al. | ....................... 29/596 |
| 7,528,520 | B2 | * | 5/2009 | Du et al. | ..................... 310/215 |

FOREIGN PATENT DOCUMENTS

FR 1345932 A 12/1963

* cited by examiner

*Primary Examiner*—Minh Trinh
(74) *Attorney, Agent, or Firm*—Robert M. Wawryzn; Jonathan M. Hines; Trego, Hines & Ladenheim, PLLC

(57) ABSTRACT

A method of insulating a coil of an electrical machine includes applying an insulating varnish to a coil of conductive wire. The varnish includes (i) a resin; (ii) a first catalyst having a first activation temperature, the first catalyst being active at room temperature; and (iii) a second catalyst with a second activation temperature substantially higher than the first activation temperature. The varnish is allowed to partially cure at room temperature. The coil is mounted to a yoke to form a rotor of the electrical machine. The rotor is operated so as to heat the coil and activate the second catalyst to complete curing of the varnish.

20 Claims, 3 Drawing Sheets

METHOD FOR INSULATING ELECTRICAL MACHINE

BACKGROUND OF THE INVENTION

This invention relates generally to electrical machines such as motors and generators, and more particularly to insulation for electrical machines.

Locomotives are commonly provided with a diesel engine or other prime mover that drives a traction alternator to generate electrical current. The current from the alternator is supplied to traction motors which drive the locomotive. The traction alternator has a rotor carrying a plurality of coils that turn inside a stator. These coils must be insulated to prevent surface tracking, which can lead to alternator failure.

Varnishes with different cure characteristics are widely used in the electric machine industry as electrical insulation for rotor coils. Air-dry and room-temperature-cure catalyzed varnishes are known and have been applied to coils using a brush-on method. Varnish applied using this method can take a long time to cure and can run off, causing bare spots on the coils.

Another known insulation process is tank dipping, in which a finished rotor is submerged into bake-cure varnish, and then transferred to an oven and baked for several hours at high temperature to cure the varnish. This process requires several crane operations, a large varnish tank and oven, and a substantial amount of energy to finish the varnish cure.

BRIEF SUMMARY OF THE INVENTION

These and other shortcomings of the prior art are addressed by the present invention, which provides a method for insulating a coil of an electrical machine using a varnish with two catalysts each active at different temperatures. The first catalyst partially cures the varnish to a tack-free yet still flexible state. The coil is then assembled to an alternator rotor. The rotor is operated during normal testing so as to heat the coil and activate the second catalyst to complete curing of the varnish.

According to one aspect of the invention, a method of insulating a coil of an electrical machine includes: (a) applying an insulating varnish to a coil of conductive wire, the varnish including: (i) a resin; (ii) a first catalyst having a first activation temperature, the first catalyst being active at room temperature; and (iii) a second catalyst with a second activation temperature substantially higher than the first activation temperature; (b) allowing the varnish to partially cure at room temperature; (c) mounting the coil to a yoke to form a rotor; (d) mounting the rotor for rotation; and (e) operating the rotor so as to heat the coil and activate the second catalyst to complete curing of the varnish.

According to another aspect of the invention, a method of assembling an alternator includes: (a) applying an insulating varnish to a coil of conductive wire, the varnish comprising: (i) a resin; (ii) a first catalyst having a first activation temperature, the first catalyst being active at room temperature; and (iii) a second catalyst with a second activation substantially higher than the first activation temperature; (b) allowing the varnish to partially cure at room temperature; (c) mounting the coil to a yoke to form a rotor; (d) installing the rotor for rotation in the alternator; and (e) operating the alternator so as to heat the coil and activate the second catalyst to complete curing of the varnish.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
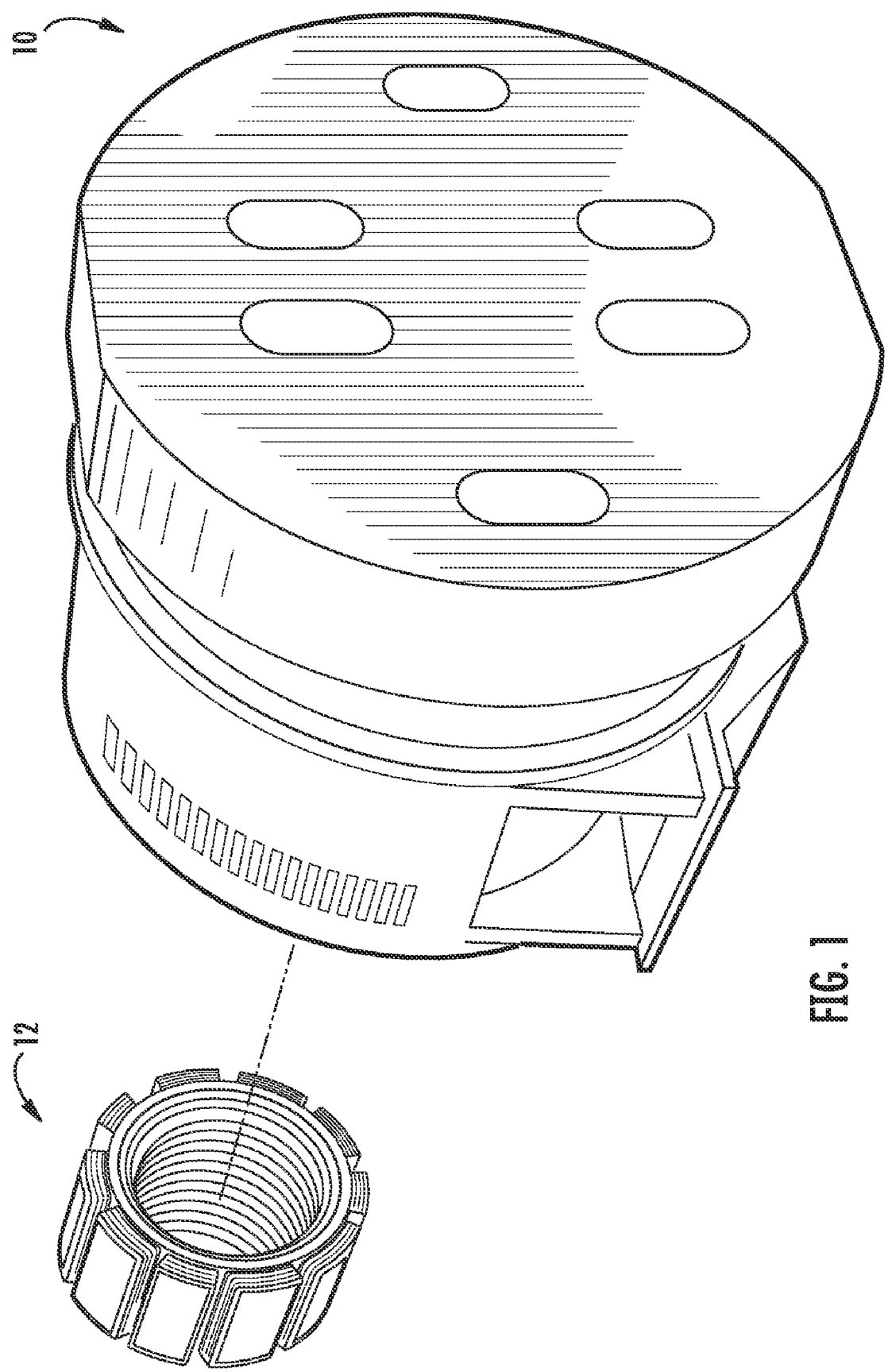
FIG. 1 is a partially-exploded perspective view of an alternator constructed in accordance with the present invention.
Figure 2:
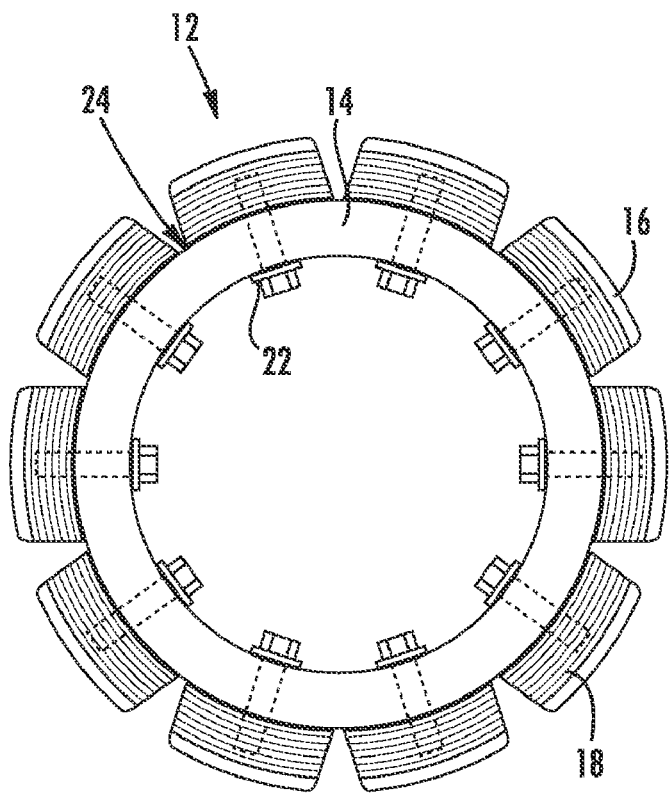
FIG. 2 is end view of a rotor of the alternator of FIG. 1.
Figure 3:
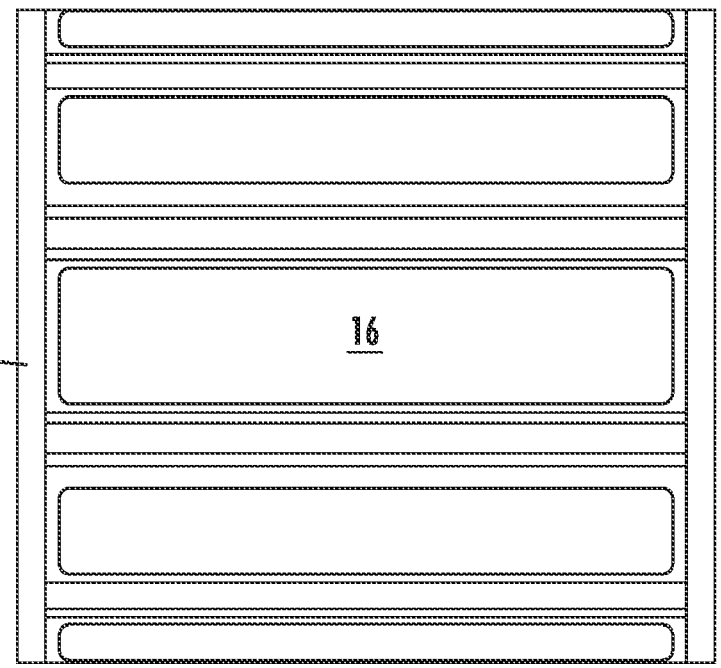
FIG. 3 is a side view of the rotor of FIG. 2.
Figure 4:
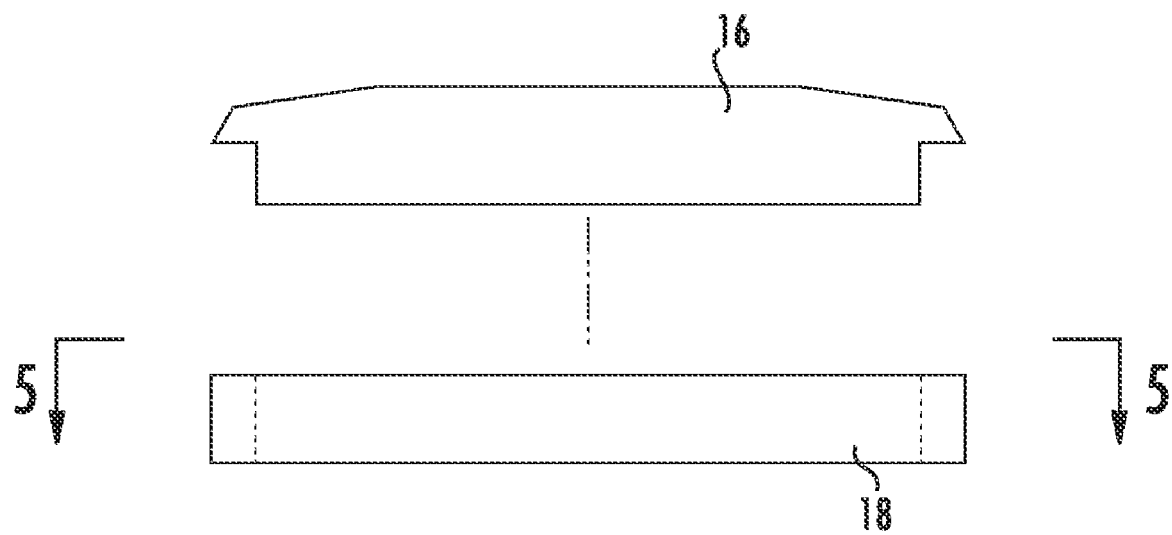
FIG. 4 is an exploded side view of a coil assembly of the rotor of FIG. 1.
Figure 5:
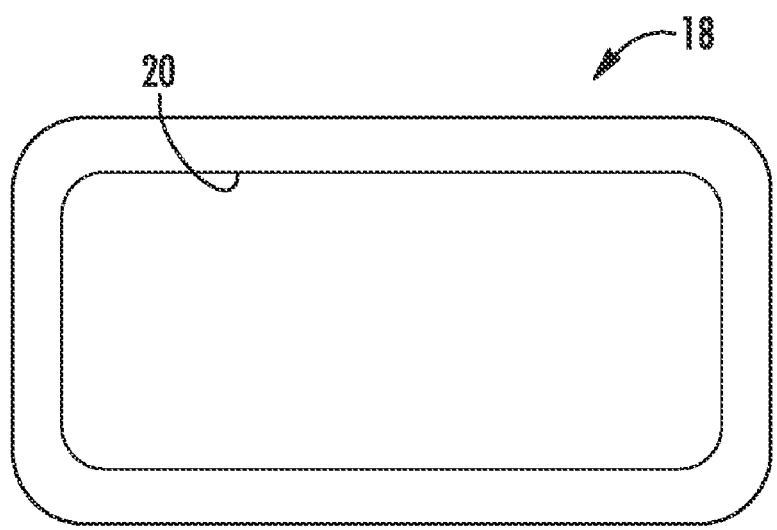
FIG. 5 is a view taken along lines 5-5 of FIG. 4.

Referring to the drawings wherein identical reference numerals denote the same elements throughout the various views, FIG. 1 depicts a traction alternator 10 of a known type. While this particular device is used to generate current to power traction motors of a railroad locomotive, it will be understood that the principles of the present invention are equally applicable to any type of electrical machine requiring an insulated coil. The alternator 10 includes a rotating rotor 12. The other components of the alternator 10 (stator, casing, etc.) are conventional in construction and are not shown. As shown more clearly in FIGS. 2-5, the rotor 12 is built up from a generally cylindrical yoke 14 and a plurality of pole pieces 16 each having a coil 18 of wire wound thereon.

The rotor 12 is assembled as follows. First, the coils 18 are fabricated or otherwise procured. In one known process, each coil 18 is edgewise wound on a fixture. Then the coil 18 is removed from the fixture and turn insulation paper (not shown) is inserted between each turn. Top and bottom insulation caps (not shown) are then added to the coil 18.

Next, insulating varnish is applied to the coil 18. The term "varnish" as used in the electrical machinery field can refer to any material which is fluid when uncured, solid when cured, and which has appropriate insulating and dielectric properties when cured, whether or not its chemical composition meets a general definition of a "varnish". Examples of known materials used for insulating varnishes include polyester, epoxy, and silicones. The varnish contains first and second catalysts. The activation temperature of the first catalyst is chosen so that the first catalyst is active at room temperature, in other words no heat other than what is normally present in the manufacturing environment is required to activate the first catalyst. For example, room temperature in a manufacturing shop which is heated but not air-conditioned might vary from about 15° C. (59° F.) to about 30° C. (86° F.). The quantity and characteristics of the first catalyst are selected to partially cure the varnish to a "tack-free" state. The second catalyst is active at a temperature above room temperature, for example about 70° C. (158° F.) to about 90° C. (194° F.).

One example of a suitable varnish is a polyester resin combined with a room-temperature catalyst and a general-purpose catalyst comprising t-butyl perbenzoate. The proportions of the resin to the room-temperature catalyst to the general-purpose catalyst are about 100:2:1. These proportions may be varied to suit a particular application. Such resins and catalysts are sold under the name PERMAFIL and are available from Von Roll USA, Inc, Schenectady, N.Y., 12306 USA.

A brush, roller, or other similar applicator may be used to apply the fluid, uncured varnish to the exterior of the coil 18. This step is performed at room temperature, as noted above. Because of the action of the first catalyst, the varnish begins to cure as soon as it is mixed and exposed to room temperature. Over a relatively short period of time, for example about 15-60 minutes, the varnish partially cures so that it is tack-free but flexible, Since the varnish does not need high temperature to start gelling, the brushed varnish does not run off from the coil surface which prevents bare spots in the insulation, a problem with prior art insulation methods.

Next, a pole piece 16 is inserted into the central opening or "window" 20 of each of the coils 18. The coils 18 are then attached to the rotor yoke 14. In the illustrated example, this is done using bolts 22 screwed into threaded keys (not shown) which are captured in the pole pieces 16. This clamps the pole pieces 16 to the yoke 14. Other types of fasteners or attachment methods could be used to attach the pole pieces 16 to the yoke 14. Furthermore, in some configurations of electrical machines, the pole pieces 16 may be integral to the yoke 14. At this stage, the varnish is still flexible to some degree. This allows the coils 18 to conform to the pole piece 16 and the curved outer surface 24 of the yoke 14 during the assembly process. This prevents chipping and cracking of the varnish, which might occur if the varnish were fully cured and rigid during rotor assembly.

The rotor 12 is then assembled into the alternator 10. At this stage, the varnish is still not fully cured. The alternator 10 is then subjected to routine testing to assure proper operation. During this testing, the alternator 10 is spun from an external power source such as an electric motor or prime mover, and various tests are conducted such as phase balance, no load saturation, short circuit test, heat-up runs and over-speed tests. No external load need be applied. During the routine test the coils 18 are electrically excited in a known manner, causing heating of the coil 18 and rotor 12. In this particular example the coils 18 are excited to their maximum current without external ventilation. Under these conditions the rotor 12 has been found to reach a temperature of about 80° C. (176° F.) to about 100° C. (212° F.). Since the second catalyst activates at about 70° C. (158° F.) to about 90° C. (194° F.), this routine testing causes the varnish to cure-out to its final solid condition. If necessary, the temperature during testing could be controlled by varying the amount of ventilation and/or excitation current applied.

The method described above provides a straightforward and reliable process to insulate the coils 18. The dual-catalyst cure feature of the insulation varnish is well-integrated into the manufacturing process, without requiring an addition manufacturing procedure. This method significantly reduces alternator rotor manufacturing cycle time, manufacturing cost and improves the insulation quality.

The foregoing has described a method for insulating an electrical machine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A method of insulating a coil of an electrical machine, comprising:
    (a) applying an insulating varnish to a coil of conductive wire, the varnish comprising:
        (i) a resin;
        (ii) a first catalyst having a first activation temperature, the first catalyst being active at room temperature; and
        (iii) a second catalyst with a second activation temperature substantially higher than the first activation temperature;
    (b) allowing the varnish to partially cure at room temperature;
    (c) mounting the coil to a yoke to form a rotor;
    (d) mounting the rotor for rotation; and
    (e) turning the rotor while applying excitation current to the coil so as to heat the coil and activate the second catalyst to complete curing of the varnish.

2. The method of claim 1 wherein the step of mounting the coil to a yoke comprises:
    (a) mounting the coil onto a pole piece; and
    (b) mounting the pole piece to the yoke.

3. The method of claim 1 wherein, after step (b), the varnish is tack-free but is still flexible enough to allow the coil to conform to the yoke.

4. The method of claim 1 wherein the rotor is heated to about 80 degrees C. to about 100 degrees C. during the step of operating the rotor.

5. The method of claim 1 wherein the varnish comprises a polyester resin.

6. The method of claim 1 wherein the second catalyst comprises t-butyl perbenzoate.

7. The method of claim 1 wherein the first activation temperature is about 15 degrees C. to about 30 degrees C.

8. The method of claim 1 wherein the second activation temperature is about 70 degrees C. to about 90 degrees C.

9. The method of claim 1 wherein the varnish consists essentially of the resin, the first catalyst, and the second catalyst.

10. The method of claim 9 wherein the proportions of the resin to the first catalyst to the second catalyst are about 100:2:1.

11. A method of assembling an alternator, comprising:
    (a) applying an insulating varnish to a coil of conductive wire, the varnish comprising:
        (i) a resin;
        (ii) a first catalyst having a first activation temperature, the first catalyst being active at room temperature; and
        (iii) a second catalyst with a second activation substantially higher than the first activation temperature;
    (b) allowing the varnish to partially cure at room temperature;
    (c) mounting the coil to a yoke to form a rotor;
    (d) installing the rotor for rotation in the alternator;
    (e) turning the rotor while applying excitation current to the coil so as to heat the coil and activate the second catalyst to complete curing of the varnish.

12. The method of claim 11 wherein the step of mounting the coil to a yoke comprises:
    (a) mounting the coil onto a pole piece; and
    (b) mounting the pole piece to the yoke.

13. The method of claim 11 wherein, after step (b), the varnish is tack-free but is still flexible enough to allow the coil to conform to the yoke.

14. The method of claim 11 wherein the varnish consists essentially of a resin, the first catalyst, and the second catalyst.

15. The method of claim 11 wherein the coil is heated to a temperature of about 80 degrees C. to about 100 degrees C. during the step of operating the alternator.

16. The method of claim 11 wherein the varnish comprises a polyester resin.

17. The method of claim 11 wherein the second catalyst comprises t-butyl perbenzoate.

18. The method of claim 11 wherein the first activation temperature is about 15 degrees C. to about 30 degrees C.

19. The method of claim 11 wherein the second activation temperature is about 70 degrees C. to about 90 degrees C.

20. The method of claim 14 wherein the proportions of the resin to the first catalyst to the second catalyst are about 100:2:1.

* * * * *